Feb. 16, 1954 — W. E. WHITE — 2,669,434
STOCKYARD FENCE
Filed Feb. 1, 1952 — 2 Sheets-Sheet 1
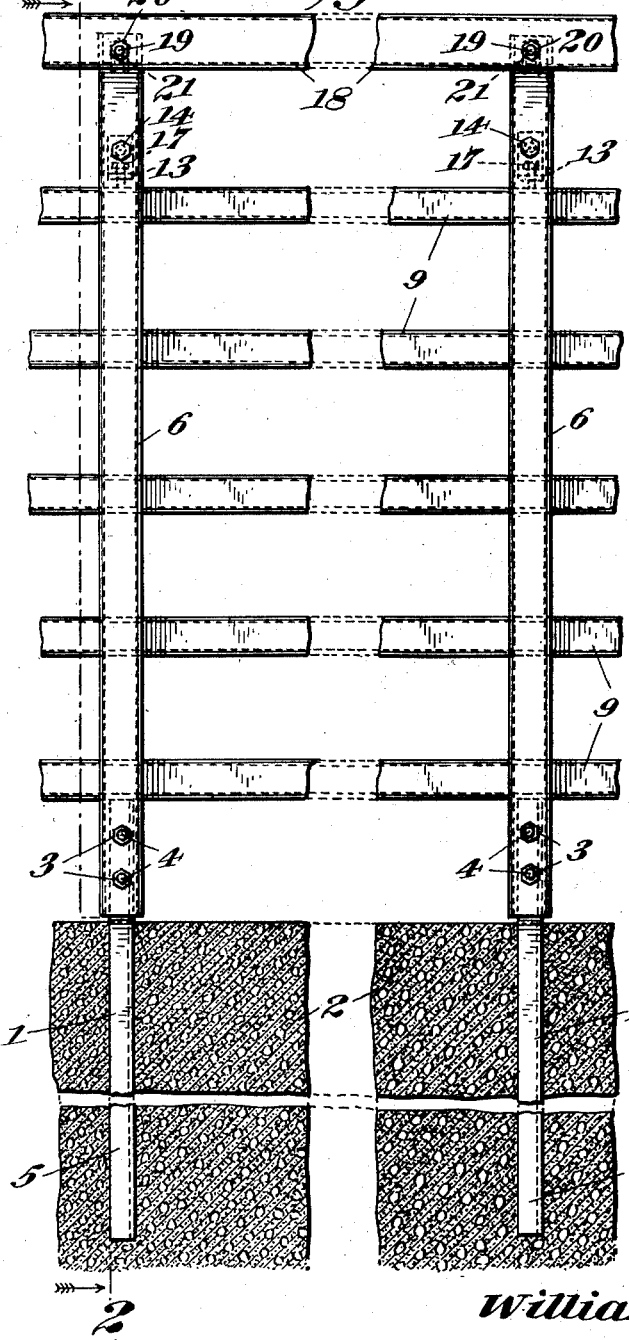
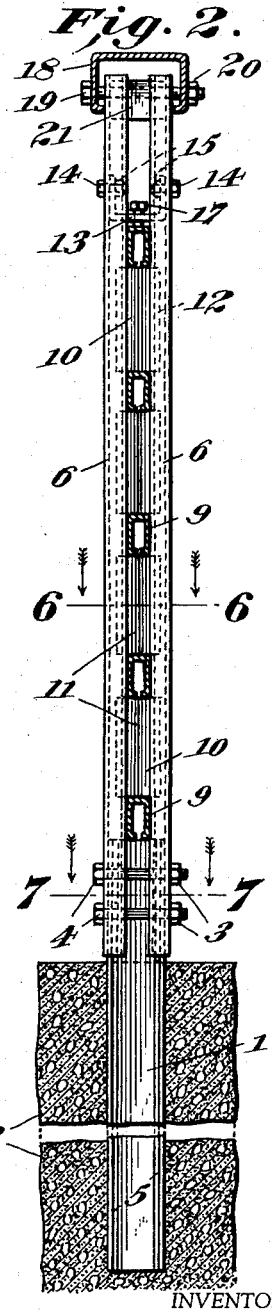
INVENTOR
William E. White.
BY R. S. A. Dougherty
ATTORNEY Feb. 16, 1954
W. E. WHITE
2,669,434
STOCKYARD FENCE
Filed Feb. 1, 1952
2 Sheets-Sheet 2
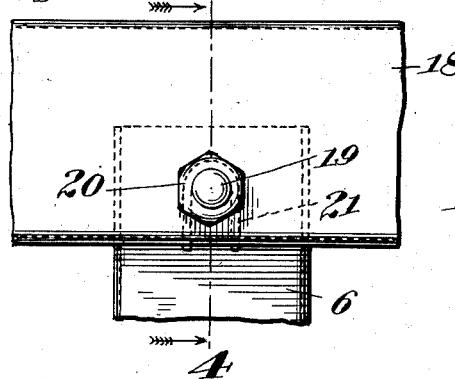
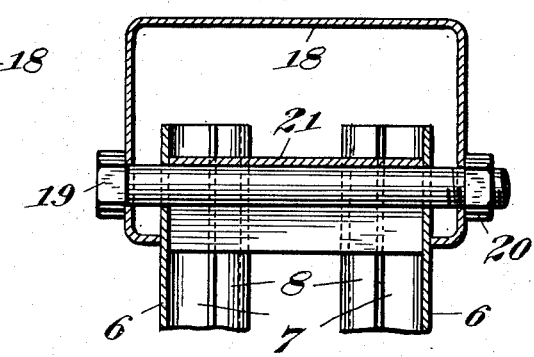
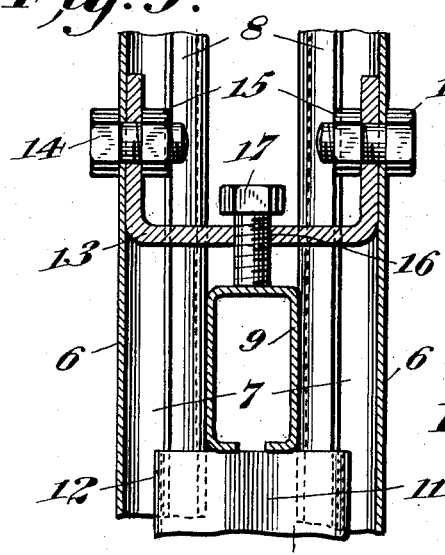
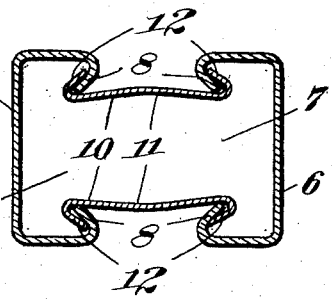
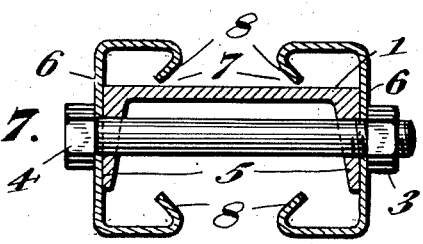
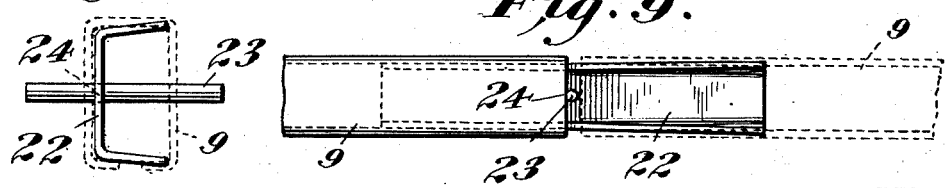
INVENTOR
William E. White.
BY R. S. A. Dougherty
ATTORNEY Patented Feb. 16, 1954

2,669,434

UNITED STATES PATENT OFFICE 2,669,434

STOCKYARD FENCE

William E. White, Bethlehem, Pa., assignor to Bethlehem Steel Company, a corporation of Pennsylvania Application February 1, 1952, Serial No. 269,446

5 Claims. (Cl. 256—59)

This invention relates in general to an improved metal fence, and more particularly to a fence construction which has special advantages for stockyard pens and the like.

In the nationally important livestock marketing and meat-packing centers, such as Chicago, Kansas City and Omaha, handling millions of animals annually, the wooden cattle pens heretofore used have been found increasingly unsatisfactory under modern conditions. The time, labor and scarce lumber needed for original construction and frequent repairs and replacements are all quite costly, and there are also the ever present risks of fire and panic among the animals.

One object of this invention, therefore, is to provide a very rugged and strong stockyard fence of metal.

Another object is to provide a metal stockyard fence only slightly more expensive than a wooden fence in original cost, and whose longer life and freedom from repairs make it much more economical over a period of years.

Another object is a metal stockyard fence which can be very rapidly and efficiently assembled by unskilled labor, and which is adapted to be set up as easily and quickly upon sloping or irregular ground as upon a level.

Other objects, purposes and advantages of the invention will appear hereinafter in the specification and in the appended claims.

In the drawings:

Figure 1 is a side elevation of a fence with two erected posts connected by longitudinal rails which together with anchor element are shown as broken and the concrete footing in section in order to permit of clearer illustration;

Fig. 2 is a vertical section taken on the line 2—2 of Fig. 1;

Fig. 3 is an enlarged side detail view of the top rail;

Fig. 4 is a vertical transverse section on the line 4—4 of Fig. 3;

Fig. 5 is an enlarged vertical transverse section of the top post spreader and setbolt;

Fig. 6 is an enlarged horizontal transverse section on the line 6—6 of Fig. 2;

Fig. 7 is an enlarged horizontal transverse section on the line 7—7 of Fig. 2;

Fig. 8 is an end elevation of the rail splice member and adjusting pin; and

Fig. 9 is a side elevation of the rail splice member inserted in a rail.

Referring now to fence parts designed by reference numerals in the drawings, each steel anchor channel 1, preferably painted to resist corrosion, has its lower end embedded in concrete 2 and its upper end projecting a suitable distance above ground level. By means of nuts 3 on transverse bolts 4 through the side flanges 5 of said channel 1, there is secured thereto, at a proper height to permit drainage of rainwater and the like, a pair of substantially channel shaped or square C-shaped uprights 6 having their open faces 7 engaging said flanges 5 and provided with side hook edges 8 which are bent rather sharply inwardly. A rail 9 of inverted U cross-section rests laterally on the top of the anchor channel 1 between the uprights 6. In turn a pair of spacers 10 of the desired height to separate the rails rests on the top of said rail 9, and supports a plurality of alternately superposed rails 9, and spacers 10 thereabove. Each such spacer 10 is slightly bowed centrally vertically as at 11 and is provided with side hook edges 12 adapted to slidably embrace the adjacent upright hook edges 8 as in Fig. 6, so as to spring the uprights 6 tightly against the sides of said rails 9. If it is desired to increase the spread between certain of said rails 9, additional pairs of spacers 10 may be placed between rails with the lower edge of the upper spacers resting on the upper edge of the lower spacers. The uprights 6 are connected together near the top by a square U-shaped spreader 13 secured therebetween by bolts 14 and nuts 15 and having a tapped center hole 16 through which a downwardly extending adjustable setbolt 17 engages the uppermost of the lateral rails 9. A substantially channel shaped or square C-shaped top rail 19 with its open side facing downward is secured by a transverse bolt 19 and nut 20 to the top of the uprights 6 and may support a catwalk (not shown) if desired. An inverted U-shaped sleeve 21 serves to cover the bolt 19 and maintains proper spacing between the tops of the uprights.

Contiguous lengths of rails 9 are connected by channel shaped splice pieces 22, sprung inside the rails as in Figs. 8 and 9, with a removable pin 23 in center hole 24 for maintaining the proper length of insertion.

Since the hard usage to which most cattle pens are subjected demands the maximum of strength, rigidity and durability consistent with economy, I prefer to form such parts as the uprights, rails and spacers of heavily galvanized steel of at least ⅛" thickness, although for other uses to which this fence may be adapted it is obvious that smaller thicknesses may suffice.

While I have described my invention hereinabove in considerable detail, I do not wish to be limited narrowly to the exact and specific details which I have there shown and described, but I may use also such substitutes, modifications or equivalents thereof as are included within the scope and spirit of the invention or pointed out in the appended claims.

I claim:

1. In a fence, the combination of a pair of parallel uprights, a plurality of alternately superposed pairs of metal spacers and lateral metal rails between said uprights, and a metal spreader connecting the uprights and having removable compression means downwardly engaging the topmost lateral rail.

2. In a fence, the combination of an anchor member extending upwardly above ground level, parallel channel shaped uprights secured thereto and having inwardly bent side hook edges, a plurality of longitudinal rail members between said uprights, a plurality of paired resilient spacer members interposed between the longitudinal rail members and having integral side hook edges slidably engaging the complementary side hook edges of the uprights, and a spreader connecting the uprights above the topmost longitudinal rail and having adjustable means pressing down on said rail.

3. The fence of claim 2 having in combination therewith a substantially channel shaped top rail horizontally disposed on the uprights with its open side facing downward, transverse bolts attaching said top rail to the uprights, and an inverted U-shaped sleeve between adjacent uprights and covering said transverse bolts.

4. The fence of claim 2 in which each rail member is formed in hollow lengths open at the bottom and having in cross section substantially the shape of an inverted U.

5. In a metal fence, the combination of an anchor member extending upward above ground level, paired square C-shaped uprights attached thereto with their open sides in face to face relationship and having inwardly bent side hook edges, a rail of inverted U cross-section resting laterally on the top of the anchor member between said uprights, a spacer member resting on the top of said rail and being slightly bowed vertically and having side hook edges adapted to engage the side hook edges of the uprights and draw them inwardly, a plurality of alternately superposed similar rails and spacer members above the first mentioned spacer member, a spreader connecting the uprights above the uppermost of said rails, a setbolt extending downwardly through said spreader and engaging the top surface of said uppermost rail, and a square C-shaped top rail fastened to said uprights.

WILLIAM E. WHITE.

References Cited in the file of this patent

UNITED STATES PATENTS

| Number | Name | Date |
|---|---|---|
| 304,496 | Brock | Sept. 2, 1884 |
| 330,584 | Hanika | Nov. 17, 1885 |
| 361,880 | Landis | Apr. 26, 1887 |
| 1,826,998 | Doddridge | Oct. 13, 1931 |
| 2,240,689 | Denton | May 6, 1941 |